United States Patent
Deselaers et al.

(10) Patent No.: US 9,699,597 B2
(45) Date of Patent: Jul. 4, 2017

(54) WIRELESS SIGNAL FORWARDING

(71) Applicant: GOOGLE INC., Mountain View, CA (US)

(72) Inventors: Thomas Deselaers, Zurich (CH); Daniel Martin Keysers, Stallikon (CH); Stephan Robert Gammeter, Zurich (CH); Matthew Sharifi, Kilchberg (CH)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/961,803

(22) Filed: Dec. 7, 2015

(65) Prior Publication Data

US 2017/0164139 A1 Jun. 8, 2017

(51) Int. Cl.
*H04W 4/00* (2009.01)
*H04B 5/00* (2006.01)
*H04W 40/24* (2009.01)

(52) U.S. Cl.
CPC .......... *H04W 4/008* (2013.01); *H04B 5/0031* (2013.01); *H04W 40/244* (2013.01)

(58) Field of Classification Search
None
See application file for complete search history.

(56) References Cited

U.S. PATENT DOCUMENTS

| 8,630,905 B2* | 1/2014 | Fisher | G06Q 20/20 235/379 |
| 2009/0191811 A1* | 7/2009 | Griffin | G06Q 20/10 455/41.1 |
| 2014/0099981 A1* | 4/2014 | Horbal | H04B 5/0031 455/466 |
| 2014/0256251 A1* | 9/2014 | Caceres | H04B 5/0031 455/41.1 |

(Continued)

FOREIGN PATENT DOCUMENTS

EP  2 947 617 A1  11/2015

OTHER PUBLICATIONS

Keogh-Lehmann, "International Search Report and Written Opinion issued in International Application No. PCT/ US2016/064986", mailed on Feb. 15, 2017, 12 pages.

*Primary Examiner* — David Bilodeau
(74) *Attorney, Agent, or Firm* — Johnson, Marcou & Isaacs, LLC

(57) ABSTRACT

Forwarding wireless signals comprises a user and a counterpart opening secure applications on a user computing device and a counterpart computing device, respectively. The user places the user computing device within range of a wireless signal, such as a wireless signal provided by a point of sale ("POS") terminal. The user computing device forwards the wireless signal from the POS terminal to the counterpart computing device. The user computing device forwards the wireless signal from the counterpart computing device to the POS terminal. Thus, the counterpart computing (Continued)

device may conduct a transaction with the POS terminal as if the counterpart computing device were at the location of the POS terminal. The counterpart computing device may also receive a forwarded beacon signal comprising data, such as an offer, provided by the POS terminal or another suitable beacon transmission device at the merchant location.

29 Claims, 5 Drawing Sheets

(56) References Cited

U.S. PATENT DOCUMENTS

| | | |
|---|---|---|
| 2015/0019443 A1 | 1/2015 | Sheets et al. |
| 2015/0126109 A1* | 5/2015 | Keshavdas ............ H04B 5/0031 455/41.1 |
| 2016/0127859 A1* | 5/2016 | Brands ................ H04L 63/0853 455/41.1 |

* cited by examiner

WIRELESS SIGNAL FORWARDING

TECHNICAL FIELD

The present disclosure relates to forwarding a near field communication ("NFC") signal or other short-range wireless communications to a remote computing device. Forwarding of the wireless signal allows the remote computing device to conduct transactions or other location specific activities through a forwarded signal via a local computing device.

BACKGROUND

Virtual transactions between a point of sale ("POS") terminal and a user computing device may be performed via NFC, Bluetooth, infrared, Wi-Fi, or any other suitable wireless or wired communication technology. Further, POS terminals and other communication devices associated with a merchant may broadcast beacon signals and other data to user computing devices via NFC, Bluetooth, infrared, Wi-Fi, or any other suitable wireless or wired communication technology. The beacon signals may comprise offers, location specific data, merchant identifications, or any other suitable data.

In conventional systems a user may be required to place a user computing device within range of the wireless signal to conduct a transaction or receive a beacon signal. For example, the user computing device needs to be able to detect the communication and receive a clear signal comprising the communication to perform the desired tasks.

In conventional systems, a computing device that is not within range of the communicated signal is unable to perform the desired tasks.

SUMMARY

Techniques herein provide computer-implemented methods to forward a near field communication ("NFC") signal or other short-range wireless communications to a remote computing device. Forwarding wireless signals comprises initiating a secure application on a user computing device that is in communication with a counterpart secure application on a counterpart computing device. The user computing device receives a wireless signal from a merchant computing device or other computing device and receives an input from a user requesting a forwarding of the wireless signal to the counterpart computing device. The user computing device converts a set of data from the wireless signal to a format that is suitable for transmission to the counterpart computing device, and communicates the set of data from the wireless signal to the counterpart computing device. In certain embodiments, the counterpart computing device may communicate a response to the user computing device for conversion into a wireless signal that is transmitted back to the merchant computing device.

In certain other example aspects described herein, systems and computer program products to forward a wireless signal to a remote computing device are provided.

These and other aspects, objects, features and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
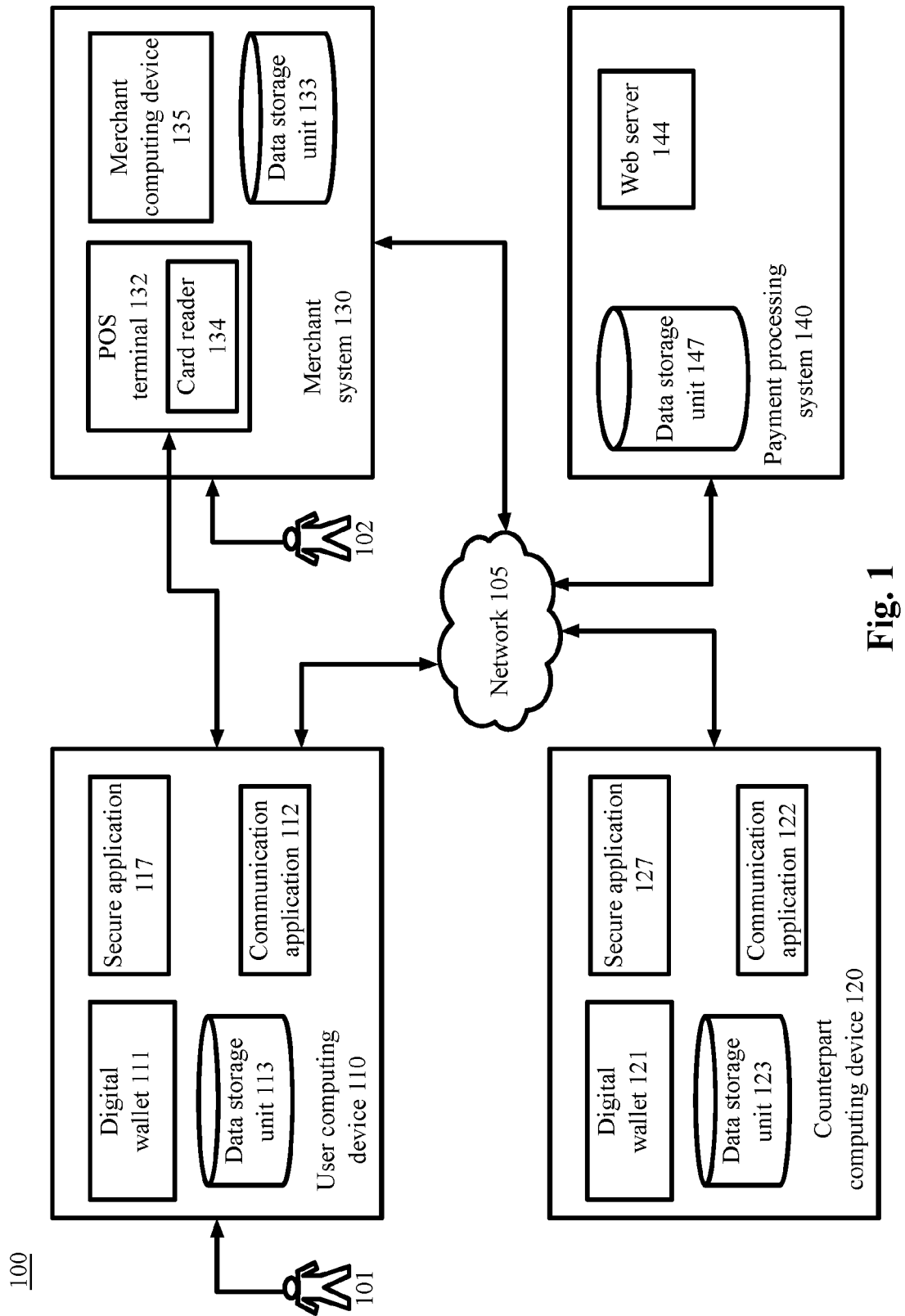
FIG. 1 is a block diagram depicting a system to provide wireless access to a remote computing device, in accordance with certain example embodiments.

In an example embodiment, a user and a counterpart opens secure applications on the user computing device and the counterpart computing device, respectively. The user places the user computing device within range of a wireless signal, such as a wireless signal provided by a merchant point of sale ("POS") terminal. The user computing device uses the secure application to forward the wireless signal from the POS terminal to the counterpart computing device. The user computing device may further forward a wireless signal from the counterpart computing device to the POS terminal. In this manner, the counterpart computing device may conduct a transaction with the POS terminal as if the counterpart computing device were at the location of the POS terminal. The counterpart computing device may additionally or alternatively receive a forwarded beacon signal comprising data, such as an offer, the beacon signal being provided by the POS terminal or another suitable beacon transmission device at the merchant location.

In an example, the user computing device approaches POS terminal at a merchant system as if to conduct a transaction. The POS terminal may broadcast a wireless signal based on a communication technology such as a near field communication ("NFC"), Bluetooth, infrared, Wi-Fi, or any other suitable wireless or wired communication technology. The POS terminal may additionally or alternatively, listen for a wireless signal based on the same or similar communication technologies.

The user initiates a secure application on the user computing device. The secure application may be a chat application, a social media site, a digital wallet application, a communication application, a specific remote forwarding application, or any other suitable application that provides a secure communication channel with a counterpart computing device. The counterpart opens a similar secure application on the counterpart computing device.

The secure applications on the user computing device and the counterpart computing device allow wireless signals to be communicated from the user computing device to the counterpart computing device and from the counterpart computing device to the user computing device. That is, when the user computing device receives a communication from the POS terminal, such as an NFC signal, the user computing device transmits the NFC signal contents to the counterpart computing device. The counterpart computing device receives the NFC signal as if the counterpart computing device were at the location of the POS terminal. In an example, the user computing device may convert the wireless signal into a format that is able to be communicated to the counterpart computing device over the Internet, via cellular, or in any suitable manner.

The counterpart computing device responds with a communication to the POS terminal. For example, if the POS terminal communicated an NFC signal to the counterpart computing device via the user computing device, then the counterpart computing device responds to the user computing device with an NFC response. The user computing device communicates the received NFC signal to the POS terminal. To the POS terminal, the signal is received as if the counterpart computing device were present and communicating directly.

In this two-way communication manner via the user computing device, a financial transaction or other transaction may be conducted. For example, a location check-in may be conducted, an access transaction, such as to board a plane, may be conducted, or any other suitable transaction.

In another example, the wireless signal may be a beacon communication. For example, a Bluetooth low energy beacon signal, or other suitable beacon signal, may be transmitted by a computing device at a merchant or other suitable location. The beacon signal may comprise data that is useful to the user computing device at the location. For example, the beacon signal may provide to the user computing device a coupon or other offer for the merchant, or other suitable information related to the merchant.

The secure applications on the user computing device and the counterpart computing device allow the beacon signal to be communicated from the user computing device to the counterpart computing device. The counterpart computing device receives the wireless beacon signal as if the counterpart computing device were at the location of the merchant computing device. The beacon signal is often a one-way communication from the merchant computing device to the user computing device. The counterpart computing device receives the beacon signal and stores or uses the data provided in the beacon signal.

In another example, the secure applications allow the counterpart computing device to function as a POS terminal for the counterpart user. The counterpart computing device may receive transaction details provided by a POS terminal via the secure applications on the user computing device and the counterpart computing device. The user interface of the counterpart computing device may display the transaction details to the counterpart as if the counterpart computing device were the POS terminal.

The counterpart may enter the information for a payment instrument into the counterpart computing device as if the counterpart computing device were the POS terminal. The data from the payment card is communicated via the forwarded NFC signal back to the POS terminal via the user computing device and the counterpart computing device. The communications required for conducting the transaction may be communicated between the counterpart computing device and the POS terminal in this manner until the transaction is completed. The forwarded NFC signal thus allows the counterpart to conduct a transaction as if the counterpart is at the location of the POS terminal.

By using and relying on the methods and systems described herein, the user computing device provides a conduit for a counterpart device, that is not at a location of a merchant or other wireless signal provider, to interact with the merchant computing device. By providing the wireless signal to a remote counterpart computing device, the systems and methods described herein may be employed to allow a counterpart to conduct transactions or receive offers as if the counterpart computing device were at the location of the user computing device. The system is improved for a user in that the user will be able to utilize payment applications and other functions of a counterpart computing device when the user is not possessing the counterpart computing device. The system is improved for a counterpart in that the counterpart will be able to take advantage of opportunities provided by wireless signals even when the counterpart is not at the location of the wireless signal.

Example System Architectures

Turning now to the drawings, in which like numerals represent like (but not necessarily identical) elements throughout the figures, example embodiments are described in detail.

FIG. 1 is a block diagram depicting a system 100 to provide wireless access to a remote computing device, in accordance with certain example embodiments. In some embodiments, a user 101 or a counterpart 102 associated with a computing device must install an application and/or make a feature selection to obtain the benefits of the techniques described herein.

As depicted in FIG. 1, the system 100 includes network computing devices 110, 120, 130, and 140 that are configured to communicate with one another via one or more networks 105 or via any suitable communication technology.

Each network 105 includes a wired or wireless telecommunication means by which network devices (including devices 110, 120, 130, and 140) can exchange data. For example, each network 105 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data. Throughout the discussion of example embodiments, it should be understood that the terms "data" and "information" are used interchangeably herein to refer to text, images, audio, video, or any other form of information that can exist in a computer-based environment. The communication technology utilized by the devices 110, 120, 130, and 140 may be similar networks to network 105 or an alternative communication technology.

Each network computing device 110, 120, 130, and 140 includes a computing device having a communication application capable of transmitting and receiving data over the network 105 or a similar network. For example, each network device 110, 120, 130, and 140 can include a server, desktop computer, laptop computer, tablet computer, a television with one or more processors embedded therein and/or coupled thereto, smart phone, handheld or wearable computer, personal digital assistant ("PDA"), wearable devices such as smart watches or glasses, or any other wired or wireless, processor-driven device. In the example embodiment depicted in FIG. 1, the network devices 110, 120, 130, and 140 are operated by end-users or consumers, counterpart end-users or consumers, merchant system operators, and payment processing system operators, respectively.

The user 101 can use the communication application 112 on a user computing device 110, which may be, for example, a web browser application or a stand-alone application, to view, download, upload, or otherwise access documents or web pages via the network 105. The communication application 112 can interact with web servers or other computing devices connected to the network 105, including the counterpart computing device 120, a merchant computing system 130, and the payment processing system 140.

In another example, the communication application 112 communicates with the point of sale ("POS") terminal 132 or a card reader 134 via near field communication ("NFC") or other wireless communication technology, such as Bluetooth, WiFi, infrared, or any other suitable technology.

The user computing device 110 may include a digital wallet application 111. The digital wallet application 111 may encompass any application, hardware, software, or process the user computing device 110 may employ to assist the user 101 in completing a purchase. The digital wallet application 111 can interact with the communication application 112 or can be embodied as a companion application of the communication application 112. As a companion application, the digital wallet application 111 executes within the communication application 112. That is, the digital wallet application 111 may be an application program embedded in the communication application 112. In certain embodiments a digital wallet of the user 101 may reside in a cloud computing environment, or in any other suitable environment.

The user computing device 110 also includes a data storage unit 113 accessible by the digital wallet application 111 and the communication application 112. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory devices or removable flash memory. In certain embodiments, the data storage unit 113 may reside in a cloud based computing system.

An example user computing device 110 comprises a secure application 117. The secure application 117 represents any application that the user 101 may use to communicate with the counterpart computing device 120 in a secure manner. The secure application 117 may be a chat application or other communication application. The secure application 117 may be a function of the digital wallet 111 of the counterpart computing device 120. The secure application 117 may be an application that is specifically utilized for the communication of the wireless signals as described herein. Any other suitable application, program, software or hardware may be used to perform the functions as described herein.

The user computing device 110 also includes a data storage unit 113 accessible by the digital wallet application module 111, the secure application 117, the communication application 112, or other applications. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory accounts or removable flash memory. In certain embodiments, the data storage unit 113 may reside in a cloud based computing system.

The counterpart 102 can use the communication application 122 on a user computing device 120, which may be, for example, a web browser application or a stand-alone application, to view, download, upload, or otherwise access documents or web pages via the network 105. The communication application 122 can interact with web servers or other computing devices connected to the network 105, including the user computing device 110 and the payment processing system 140.

In another example, the communication application 122 communicates with the merchant computing device 135, the POS terminal 132, or a card reader 134 via near field communication ("NFC") or other wireless communication technology, such as Bluetooth, WiFi, infrared, or any other suitable technology via the invention described herein.

The counterpart computing device 120 may include a digital wallet application 121. The digital wallet application 121 may encompass any application, hardware, software, or process the counterpart computing device 120 may employ to assist the counterpart 102 in completing a purchase. The digital wallet application 121 can interact with the communication application 122 or can be embodied as a companion application of the communication application 122. As a companion application, the digital wallet application 121 executes within the communication application 122. That is, the digital wallet application 121 may be an application program embedded in the communication application 122. In certain embodiments a digital wallet of the counterpart 102 may reside in a cloud computing environment, or in any other suitable environment.

The counterpart computing device 120 also includes a data storage unit 123 accessible by the digital wallet application 121 and the communication application 122. The example data storage unit 123 can include one or more tangible computer-readable storage devices. The data storage unit 123 can be stored on the counterpart computing device 120 or can be logically coupled to the counterpart computing device 120. For example, the data storage unit 123 can include on-board flash memory and/or one or more removable memory devices or removable flash memory. In certain embodiments, the data storage unit 123 may reside in a cloud based computing system.

An example counterpart computing device 120 comprises a secure application 127. The secure application 127 represents any application that the counterpart 102 may use to communicate with the user computing device 110 in a secure manner. The secure application 127 may be a chat application or other communication application. The secure application 127 may be a function of the digital wallet 121 of the counterpart computing device 120. The secure application 127 may be an application that is specifically utilized for the communication of the wireless signals as described herein. Any other suitable application, program, software or hardware may be used to perform the functions as described herein.

The counterpart computing device 120 also includes a data storage unit 123 accessible by the digital wallet application module 121, the secure application 127, the communication application 122, or other applications. The example data storage unit 123 can include one or more tangible computer-readable storage devices. The data storage unit 123 can be stored on the counterpart computing device 120 or can be logically coupled to the user computing device 120. For example, the data storage unit 123 can include on-board flash memory and/or one or more removable memory accounts or removable flash memory. In certain embodiments, the data storage unit 123 may reside in a cloud based computing system.

The payment processing system 140 may include a data storage unit 147 accessible by the web server 144. The example data storage unit 147 can include one or more tangible computer-readable storage devices, or the data storage unit may be a separate system, such as, a different physical or virtual machine, or a cloud-based storage service.

The payment processing system 140 may be any system that manages, configures, enables, or otherwise services a payment account for a user 101. The payment processing computing system 140 includes a data storage unit 147 accessible by the web server 144. The example data storage unit 147 can include one or more tangible computer-readable storage devices. The payment processing system 140 is operable to conduct payments between a user 101 and a merchant system 130. The payment processing system 140 is further operable to manage a payment account of a user 101, maintain a database to store transactions of the merchant system 130 and the user 101, verify transactions, and perform other suitable functions. Similar services may be provided for a counterpart 102.

The user 101 or a counterpart 102 may use a web server 144 on the payment processing system 140 to view, register, download, upload, or otherwise access the payment processing system 140 via a website (not illustrated) and a communication network 105). The user 101 or the counterpart 102 associates one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101 or the counterpart 102.

An example merchant system 130 comprises a merchant computing device 135, a data storage unit 133, a merchant POS terminal 132, and a card reader 134. The merchant system 130 additionally represent any third party system, such as a church, gym, school, museum, or other entity that may not perform the functions of a merchant. The functions described herein as being performed by a merchant system 130 may be performed by any third party system.

In an example embodiment, the merchant computing device 135 communicates with the payment processing system 140 to conduct transactions. The merchant computing device 135 receives data from the POS terminal 132 and assists in conducting transactions with payment processing systems, card issuers, and other suitable systems.

In an example embodiment, the data storage unit 133 can include any local or remote data storage structure accessible to the merchant system 130 suitable for storing information. In an example embodiment, the data storage unit 133 stores encrypted information.

In an example embodiment, the merchant POS terminal 132, such as a cash register, is capable of processing a purchase transaction initiated by a user 101. In an example embodiment, the merchant system 130 operates a commercial store and the user 101 indicates a desire to make a purchase by presenting a form of payment at the merchant POS terminal 132. In an example embodiment, the merchant POS terminal 132 is capable of communicating with the user computing device 110 using an NFC, Bluetooth, and/or Wi-Fi communication method. In an example, the POS terminal 132 utilizes a card reader 134 to communicate with a user computing device 110 of the user 101. The card reader may receive data from a magnetic stripe, NFC, or any other suitable payment instrument technology.

The merchant computing device 135, the POS terminal 132, or another suitable computing device may be configured to broadcast a beacon signal. The beacon signal may be broadcast as a Bluetooth low energy beacon signal or via any other suitable beacon signal technology, such as Wi-Fi or infrared. In an example, a remote computing device (not shown) may be place in a particular location and configured to broadcast the beacon signal to computing devices in the that location.

It will be appreciated that the network connections shown are examples and other means of establishing a communications link between the computers and devices can be used. Moreover, those having ordinary skill in the art having the benefit of the present disclosure will appreciate that the merchant system 130, digital wallet system 140, the counterpart computing device 120, and the user computing device 110 illustrated in FIG. 1 can have any of several other suitable computer system configurations. For example, a user computing device 110 embodied as a mobile phone or handheld computer may not include all the components described above.

Figure 5:
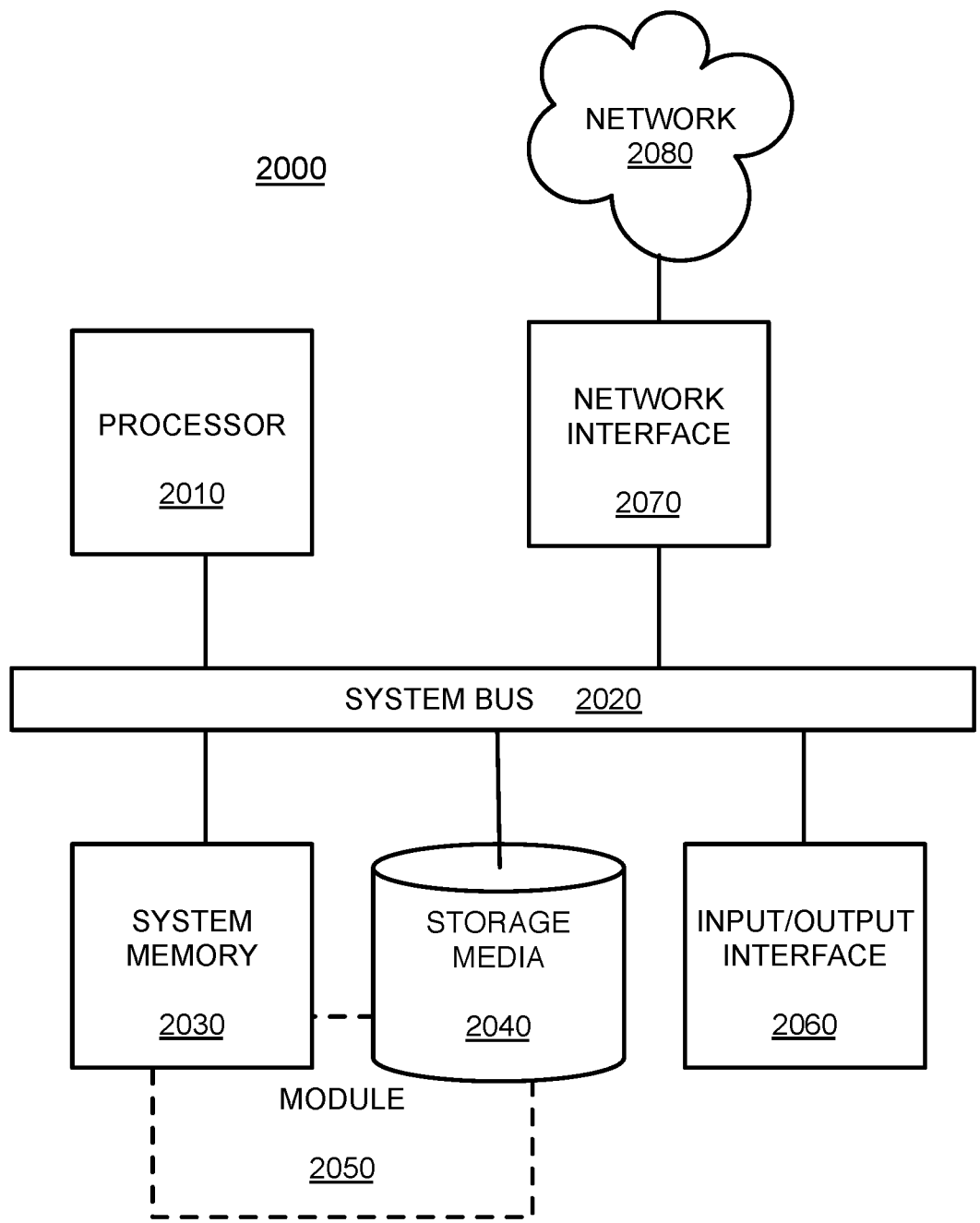
FIG. 5 is a block diagram depicting a computing machine and a module, in accordance with certain example embodiments.

In example embodiments, the network computing devices and any other computing machines associated with the technology presented herein may be any type of computing machine such as, but not limited to, those discussed in more detail with respect to FIG. 5. Furthermore, any functions, applications, or modules associated with any of these computing machines, such as those described herein or any other others (for example, scripts, web content, software, firmware, or hardware) associated with the technology presented herein may by any of the modules discussed in more detail with respect to FIG. 5. The computing machines discussed herein may communicate with one another, as well as with other computing machines or communication systems over one or more networks, such as network 105. The network 105 may include any type of data or communications network, including any of the network technology discussed with respect to FIG. 5.

Example Processes

Figure 2:
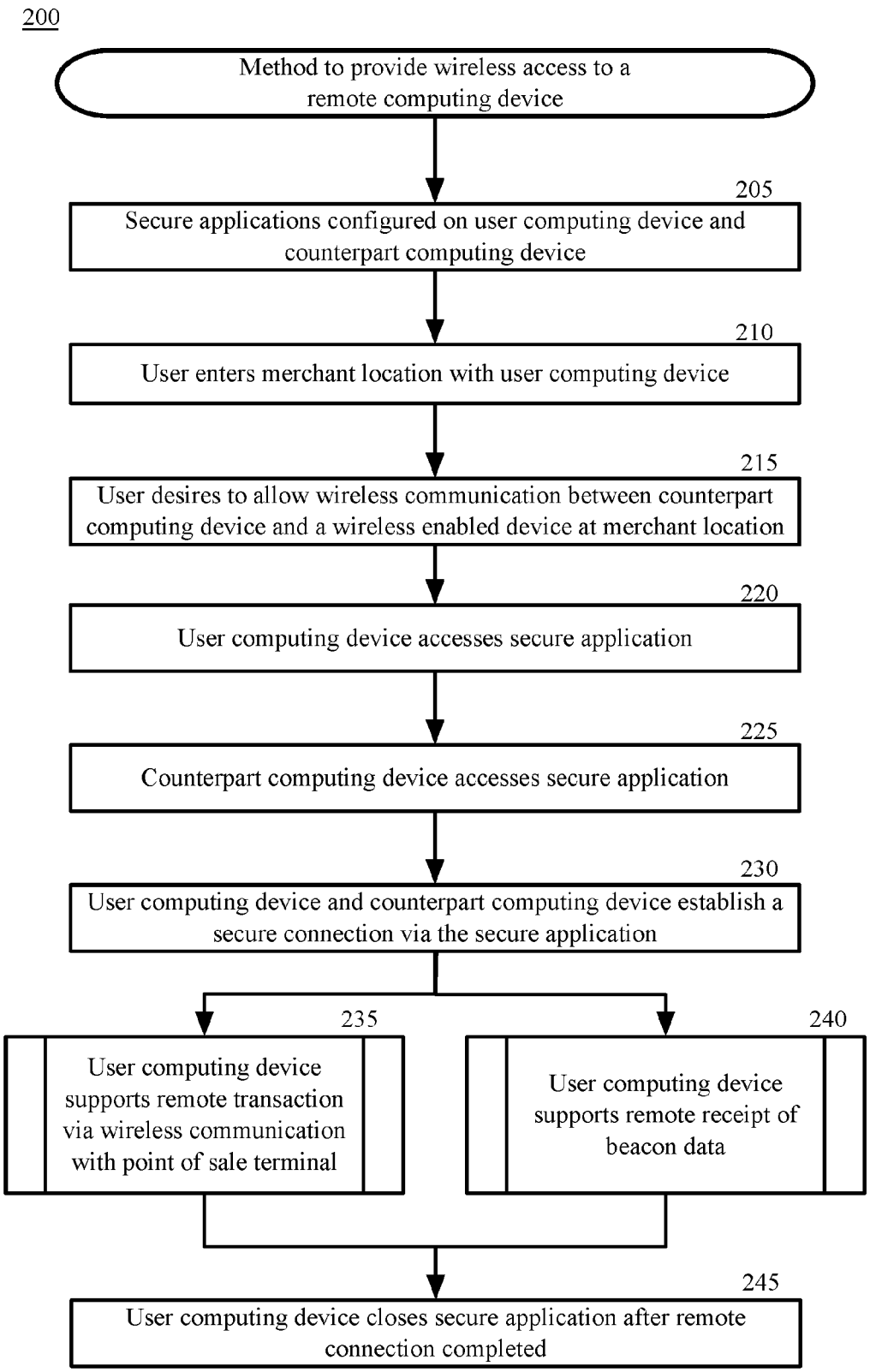
FIG. 2 is a block flow diagram depicting a method to provide wireless access to a remote computing device, in accordance with certain example embodiments.
Figure 3:
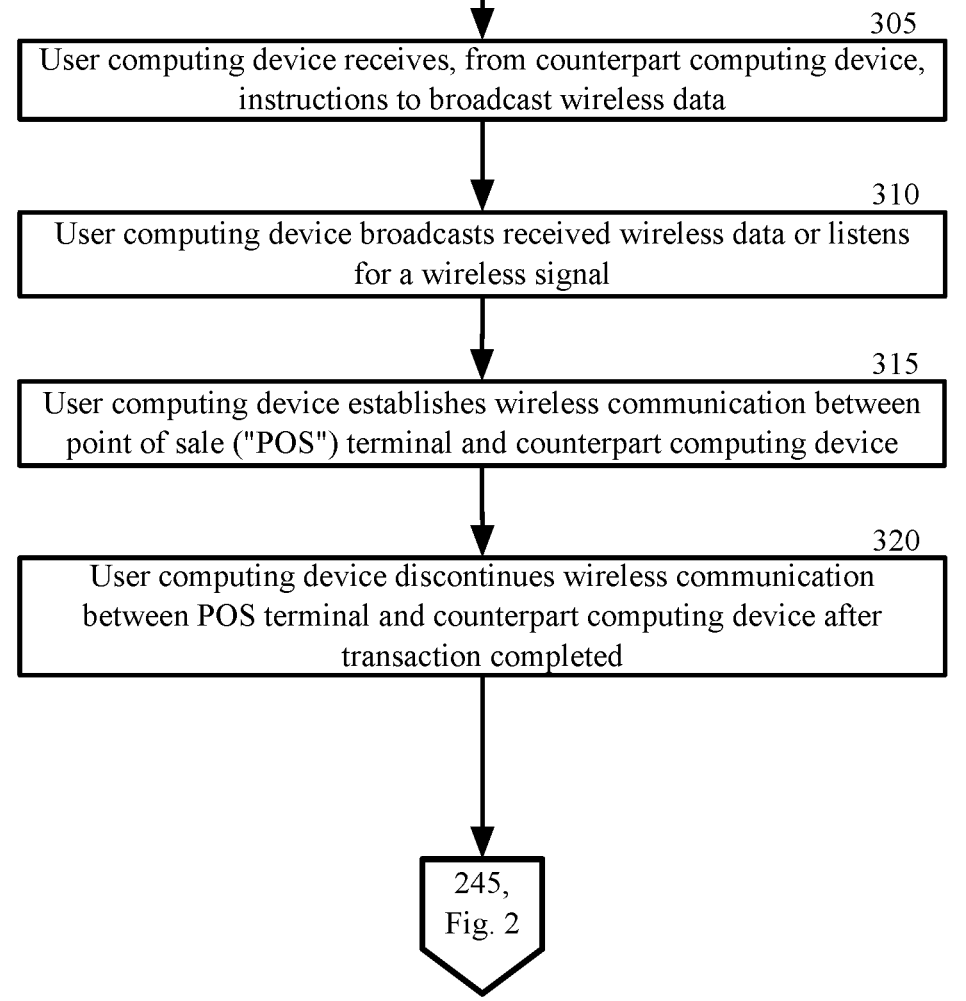
FIG. 3 is a block flow diagram depicting a method to support a remote transaction via wireless communication with a point of sale terminal, in accordance with certain example embodiments.
Figure 4:
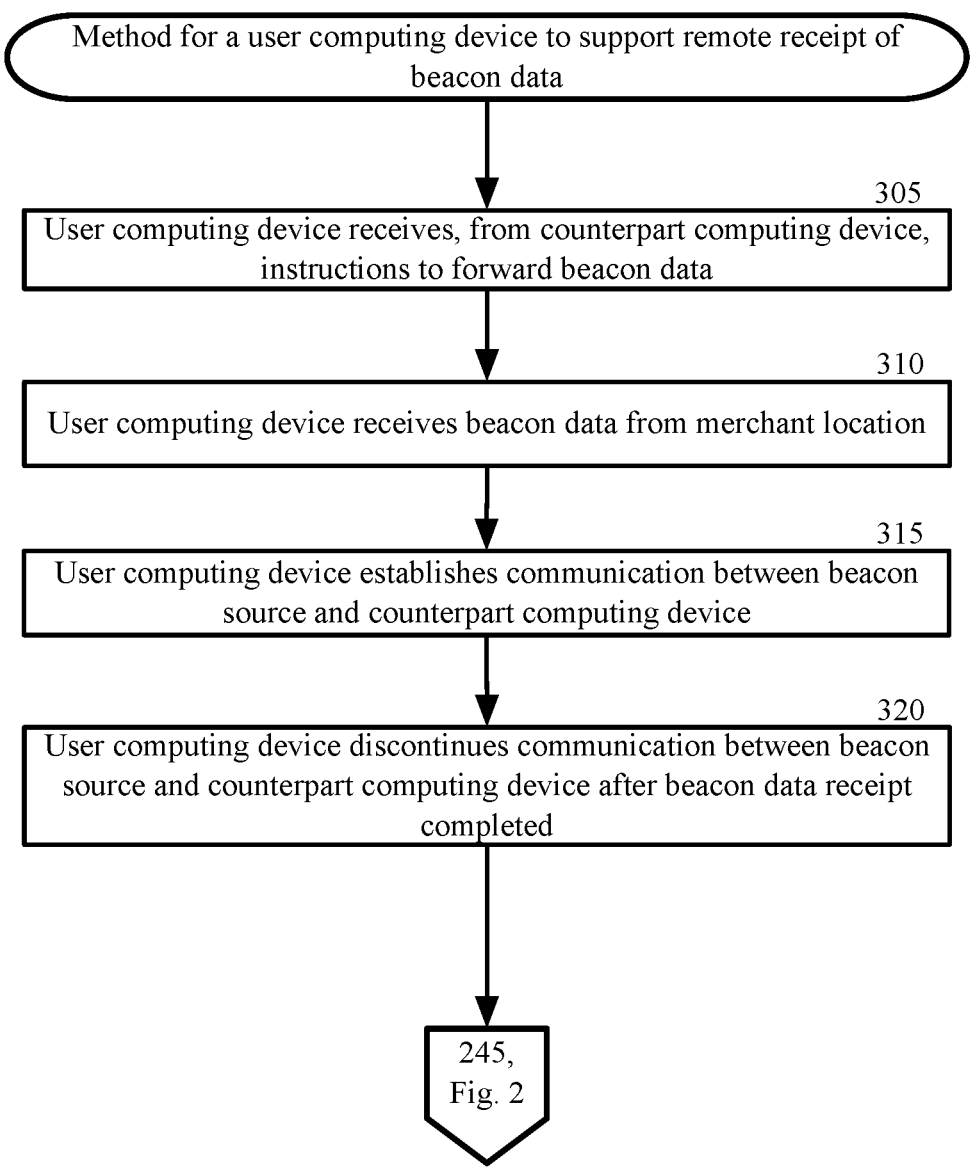
FIG. 4 is a block flow diagram depicting a method to support remote receipt of beacon signal data, in accordance with certain example embodiments.

The example methods illustrated in FIGS. 2-4 are described hereinafter with respect to the components of the example operating environment 100. The example methods of FIGS. 2-4 may also be performed with other systems and in other environments.

FIG. 2 is a block flow diagram depicting a method 200 to provide wireless access to a remote computing device, in accordance with certain example embodiments.

With reference to FIGS. 1 and 2, in block 205, secure applications 117, 127 are configured on a user computing device 110 and a counterpart computing device 120. The secure application 117, 127 may be a chat application, a social network application, a digital wallet application 111, 121, a communication application 112, 122, a specific remote forwarding application, or any other suitable application that provides a secure communication channel with a counterpart computing device and a POS terminal. The user 101 and the counterpart 102 may be required to authorize certain functions on the secure applications 117, 127 to enable the remote wireless forwarding to be practiced as described herein.

In block 210, the user 101 enters a merchant location with the user computing device 110. The merchant location employs one or more of a point of sale ("POS") terminal 132, a card reader 134, and any suitable merchant computing system 135. The user computing device 110 may be active or in a "sleep" mode. The user computing device 110 is taken within the range of the wireless signal being broadcast. In certain examples, the merchant computing system 135 is broadcasting a beacon signal via a Bluetooth low energy signal. The user computing device 110 enters the range of the signal and receives the beacon signal. In another example, the POS terminal 132 broadcasts an NFC signal for initiation of a financial transaction. In another example, the POS terminal 132 listens for an NFC signal comprising a request from a user computing device 110 to initiate a transaction.

In block 215, a user 101 desires to allow wireless communication between counterpart computing device 120 and a wireless enabled device at merchant location, such as the POS terminal 132. In an example, the user 101 left a payment instrument at home and desires to conduct a transaction with the merchant system 130. The user 101 may contact the counterpart 102 and request that the counterpart 102 perform an NFC transaction with the merchant system 130. In another example, the user 102 is at a merchant system 130 location and locates an item that the counterpart 102 wants to purchase. The counterpart 102 may desire to purchase the item from the remote location via the user computing device 101. In another example, the user 101 may receive a beacon signal from a merchant computing system 130 that comprises a coupon. The counterpart 102 may desire to receive the beacon signal with the counterpart computing device 120 even though the counterpart 102 is not at the location of the merchant system 130.

In block 220, the user 101 accesses a secure application 117. For example, the user 101 may identify the application that allows the invention to be practiced on the user computing device 110 and the counterpart computing device 120. The secure application 117 may be a chat application, a social media site, a digital wallet application 111, a communication application 112, a specific remote forwarding application, or any other suitable application that provides a secure communication channel with a counterpart computing device 120 and a POS terminal 132.

The secure application 117 is configured by the user 101 to allow the forwarding of wireless signals. For example, the user 101 may provide authorization for this feature. The user 101 may provide a list of authorized counterparts with which the invention may be practiced. The user 101 may limit the types of transactions or signals that may be forwarded. For example, a user 101 may configure the secure application 117 to forward Bluetooth beacon signals, but not NFC financial transactions.

In a certain example, when the user 101 initiates a forwarding of the wireless signals, the user computing device 110 automatically converts to a secure application 117. For example, if the user 101 is engaged in a chat with the counterpart 102 on a chat application, the user computing device 110 will initiate a secure version of the chat application or open a secure application 117 on the user computing device 110.

In block 225, the counterpart 102 accesses a secure application 127. For example, the counterpart 102 may identify the application that allows the invention to be practiced on the counterpart computing device 120 and the user computing device 110. The counterpart 102 may inquire of the user 101 which application will be used as the secure application 117, 127. In another example, if the user 101 and the counterpart 102 are in a remote conversation, such as on a social media site, then the social media site may have a button or other selectable object to allow the wireless signaling to be forwarded.

The secure application 127 may be a chat application, a social media site, a digital wallet application 121, a communication application 122, a specific remote forwarding application, or any other suitable application that provides a secure communication channel with a user computing device 110 and a POS terminal 132.

The secure application 127 is configured by the counterpart 102 to allow the forwarding of wireless signals. For example, the counterpart 102 may provide authorization for this feature. The counterpart 102 may provide a list of authorized counterparts with which the invention may be practiced. The counterpart 102 may limit the types of transactions or signals that may be forwarded. For example, a counterpart 102 may configure the secure application 127 to forward Bluetooth beacon signals, but not NFC financial transactions.

In block 230, the user computing device 110 and counterpart computing device 120 establish a secure connection via the secure application 117, 127. Certain applications that may be used as the secure application 117, 127 may be secure at all times. For example, a digital wallet application 111, 121 may be designed and configured to operate at a maximum level of security continuously. Conversely, certain applications may operate with relaxed security during normal operations. For example, a chat application may not operate at a high security level until requested by the user 101. At the time that the user 101 and the counterpart 102 engage the process of forwarding the wireless signal, the application 117, 127 establishes a secure connection if one is not already established.

In an example, the user 101 and the counterpart 102 are engaged in a chat conversation on a chat application. When the user 101 and the counterpart 102 decide to engage the process of forwarding the wireless signal, one or both of the user 101 and the counterpart 102 select an option, such as a selectable button on the user interface of the chat application, to initiate the forwarding process. At this time the user computing device 110 and the counterpart computing device 120 establish a secure connection. The secure connection may be established by any suitable means, such as by an exchange of security codes or by switching to an alternate communication network.

In an example, the user 101 and the counterpart 102 desire to allow a remote transaction via wireless communication. In block 235, the user computing device 110 supports a remote transaction via wireless communication with the POS terminal 132. The details of block 235 are described in greater detail with respect to method 235 of FIG. 3.

FIG. 3 is a block flow diagram depicting a method 235 for a user computing device 110 to support a remote transaction via wireless communication with the POS terminal 132, in accordance with certain example embodiments.

In block 305, the user computing device 110 receives, from the counterpart computing device 120, instructions to broadcast wireless data. For example, if the counterpart 102 desires to conduct a wireless transaction with a POS terminal 132 that is at the location of the user computing device 110, but not the location of the counterpart computing device 120, then the counterpart 102 may initiate the transaction. For example, the counterpart 102 may select an option to begin transmitting data to initiate the transaction via NFC, Bluetooth, infrared, or any suitable wireless signal technology. In another example, the counterpart 102 may select an option for the counterpart computing device 120 to begin listening for a wireless signal.

The counterpart computing device 120 communicates the command to the user computing device 110. For example, the counterpart computing device 120 transmits instruction to the user computing device 110 via an Internet connection over the network 105, via a cellular connection, or in any other suitable manner. In an example, the communication instructs the user computing device 110 to broadcast a wireless signal specified by the counterpart computing device 120, such as an NFC transmission. That is, the desired NFC transmission of the counterpart computing device 120 is converted to a signal that is transmitted to the user computing device 110 where the user computing device 110 will convert the signal back to an NFC communication. The broadcast may include an account number of the counterpart payment account, a simple request to initiate a transaction, or any other suitable data.

In block 310, the user computing device 110 broadcasts the received wireless data or listens for a wireless signal. When the user computing device 110 receives the instructions from the counterpart computing device 120, the user computing device 110 begins to broadcast the NFC communication or listen for an NFC communication from the POS terminal 132. For example, the user computing device 110 converts the data provided by the counterpart computing device 120 and prepares an NFC or other wireless communication signal. The user computing device 110 broadcasts the wireless signal for reception by the POS terminal 132 or other computing device. In an example, the user 101 may place the user computing device 110 in a position near the POS terminal 132 or the card reader 134 to allow the wireless signal to be received.

In another example, the user computing device 110 listens for a wireless signal from the POS terminal 134 or other computing device. For example, the user 101 may place the user computing device 110 in a position near the POS terminal 132 or the card reader 134 to receive any broadcasts that will initiate a transaction.

In block 315, the user computing device 110 establishes a wireless communication between the POS terminal 133 and the counterpart computing device 120. Signals from the POS terminal 132 are transmitted to the counterpart computing device 120 via the Internet connection from the user computing device 110 to the counterpart computing device 120. Signals from the counterpart computing device 120 are transmitted to the POS terminal 132 via the Internet connection from the user computing device 110 to the counterpart computing device 120. In another example, the wireless signals are transmitted via a cellular connection from the user computing device 110 to the counterpart computing device 120. Any other suitable communication technology may be used.

When the wireless signals from the counterpart computing device 120 are received by the user computing device 110, the wireless signals are converted to data that is transmitted to the counterpart computing device 120. When data from the counterpart computing device 120 is received by the user computing device 110, the data is converted into a wireless signal that is transmitted to the POS terminal 132. In this manner the wireless signals from the POS terminal 132 are received by the counterpart computing device 120 as if the counterpart computing device 120 were at the location of the POS terminal 132. Further, the communications from the counterpart computing device 120 are received by the POS terminal 132 as if the counterpart computing device 120 were at the location of the POS terminal 132 and communicating via wireless signals.

In this manner the counterpart computing device 120 and the POS terminal 132 may conduct a transaction such as a financial transaction using the payment processing system 140. The transaction may be conducted using the traditional manner of conducting virtual transactions between a mobile computing device and a POS terminal 132. For example, the POS terminal 132 submits an authorization request to the payment processing system 140 and receives an authorization request from the payment processing system 140.

In block 320, the user computing device 110 discontinues the wireless communication between the POS terminal 132 and counterpart computing device 120 after the transaction is completed. The counterpart computing device 120 may continue communications until a transaction is completed or the communication is terminated. The transaction may be a financial transaction, a loyalty check-in, an access request, or any other suitable transaction. After completion of the transaction, the counterpart computing device 120 or the POS terminal 132 may indicate to the user computing device 110 that the transaction is complete.

From block 320, the method 235 returns to block 245 of FIG. 2.

In block 245 of FIG. 2, the user computing device 110 closes the secure application after remote connection completed. The user 101 may end the communication by selecting an option to end the transaction communication. In another example, the user 101 or the counterpart 102 may select an option to end the secure communication and thus ending the transaction communications. In an example, the user 101 and the counterpart 102 may continue communicating after ending the secure communication, such as by returning a chat application to a less secure mode. In this mode, the forwarding of the wireless signal is ended.

Returning to block 240 of FIG. 2, the user computing device 110 supports remote receipt of beacon signal data. The details of block 240 are described in greater detail with respect to method 240 of FIG. 4.

FIG. 4 is a block flow diagram depicting a method 240 for a user computing device 110 to support remote receipt of beacon signal data, in accordance with certain example embodiments.

In block 405, the user computing device 110 receives, from the counterpart computing device 120, instructions to receive beacon signal data. For example, if the counterpart 102 desires to forward a wireless broadcast of a beacon signal from a merchant computing device 135, such as a POS terminal 132 or other broadcasting computing device that is at the location of the user computing device 110, but not at the location of the counterpart computing device 120. In an example, a merchant system 130 may place a computing device 135 at the entrance to the merchant location broadcasting a Bluetooth low energy beacon signal with data for one or more coupons to be used at the location. In another example, the beacon signal may be for a loyalty check-in. Any other suitable broadcast may be transmitted by the merchant computing device 135, for receipt by user computing devices 110.

The beacon signal from the merchant computing device 135 may use a token, a one-time code, a merchant identification, or other manner of authenticating the receipt of the wireless signal. In a conventional usage, the data from the broadcast may be received by the user computing device 110 and stored on the user computing device 110. The data may be forwarded to a server associated with the merchant system 130, the payment processing system 140, or any other suitable party. The data may be used by the user computing device 110 to receive a discount on a future transaction with the merchant system 130. The data from the beacon signal may be used for any other suitable purpose.

In many embodiments, the beacon signal is a one-way communication. That is, the beacon signal is broadcast by the merchant computing device 135 and received by the user computing device 110, but a return communication to the merchant computing device 135 is neither expected or accepted.

In the example, the counterpart 102 desires to receive the beacon signal that is at the location of the user 101. The counterpart 102 may select an option for the counterpart computing device 120 to begin listening for a beacon signal.

The counterpart computing device 120 communicates the command to the user computing device 110. For example, the counterpart computing device 120 transmits instruction to the user computing device 110 via an Internet connection over the network 105, via a cellular connection, or in any other suitable manner. In an example, the communication will instruct the user computing device 110 to listen for the beacon signal from the merchant computing device 135. Any received beacon signal is converted to a signal that is transmitted by the user computing device 110 to counterpart computing device 120. For example, the beacon signal data is converted to a data package that may be transmitted to the counterpart computing device 120 over the Internet via the network 105. The data is then communicated to the counterpart computing device 120.

In block 410, the user computing device 110 receives beacon signal data from the merchant computing device 135 at the merchant location. When the user computing device 110 receives the instructions from the counterpart computing device 120, the user computing device 110 listens for a wireless signal or other beacon signal from the merchant computing device 135. For example, the user 101 may place the user computing device 110 in a position near the merchant computing device 135, the POS terminal 132 or the card reader 134, or any other broadcasting device to receive any beacon signals.

In block 415, the user computing device 110 establishes a wireless communication between the merchant computing device 135 and the counterpart computing device 120. Signals from the merchant computing device 135 are transmitted to the counterpart computing device 120 via the Internet connection from the user computing device 110 to the counterpart computing device 120. In another example, the beacon signal is transmitted via a cellular connection from the user computing device 110 to the counterpart computing device 120. Any other suitable communication technology may be used.

In this manner the beacon signal from the merchant computing device 135 is received by the counterpart computing device 120 as if the counterpart computing device 120 were at the location of the merchant computing device 135.

In block 420, the user computing device 110 discontinues the wireless communication between the merchant computing device 135 and counterpart computing device 120 after the beacon signal receipt is completed. The counterpart computing device 120 may continue attempting to receive data until the beacon signal data is completely received or the communication is terminated. After completion of the transmission, the counterpart computing device 120 may indicate to the user computing device 110 that the transaction is complete.

From block 420, the method 240 returns to block 245 of FIG. 2.

In block 245 of FIG. 2, the user computing device 110 closes the secure application after remote connection completed. The user 101 may end the communication by selecting an option to end the transaction communication. In another example, the user 101 or the counterpart 102 may select an option to end the secure communication and thus ending the transaction communications. If the user 101 or the counterpart 102 may continue communicating after ending the secure communication, such as by returning a chat application to a less secure mode. In this mode, the forwarding of the wireless signal is ended.

Example Systems

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a wearable computer, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology.

It should also be appreciated that the system memory 2030 may include, or operate in conjunction with, a non-volatile storage device such as the storage media 2040.

The storage media 2040 may include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to allow remote computing devices access to proximity wireless signals of local computers and allow remote computing devices to conduct transactions with merchant terminals, comprising:
    initiating, using one or more local computing devices, a digital wallet secure application that is in communication with a counterpart digital wallet secure application on a remote computing device;
    receiving, using the one or more local computing devices, a proximity wireless signal from a merchant system computing device at a merchant location;
    receiving on the digital wallet secured application, using the one or more local computing devices, an input from a user requesting a forwarding of the wireless signal to the remote computing device that is out of range of the proximity wireless signal;
    converting, using the one or more local computing devices, a set of data from the proximity wireless signal to a format that is suitable for transmission to the remote computing device;
    communicating, using the one or more local computing devices, the formatted set of data from the proximity wireless signal to the remote computing device;
    receiving, using the one or more local computing devices, a communication from the remote computing device, the communication comprising a second set of data for transmitting via a second proximity wireless signal to the merchant system computing device, wherein the second set of data comprises broadcast data and instructions to broadcast wireless data to the merchant system computing device;
    converting, using the one or more local computing devices, the second set of data into a format suitable for broadcast communication via the second wireless signal;
    broadcasting, using the one or more local computing devices, the second set of data via the second proximity wireless signal to the merchant system computing device; and establishing, using the one or more local computing devices, wireless communication between the merchant system computing device and the remote computing device.

2. The computer-implemented method of claim 1, further comprising:
    receiving, using the one or more local computing devices, an input from the user requesting that the forwarding of the proximity wireless signal to the remote computing device be disabled; and
    disabling, using the one or more local computing devices, the forwarding of the proximity wireless signal to the remote computing device.

3. The computer-implemented method of claim 1, wherein the communication of the data from the merchant system computing device and the data from the remote computing device are sufficient to conduct a financial transaction.

4. The computer-implemented method of claim 1, wherein the communication of the data from the merchant system computing device and the data from the remote computing device are sufficient to provide an offer to the remote computing device.

5. The computer-implemented method of claim 1, wherein the proximity wireless signal from the merchant system computing device is a beacon signal.

6. The computer-implemented method of claim 5, wherein the beacon signal is transmitted via Bluetooth or infrared.

7. The computer-implemented method of claim 1, wherein the proximity wireless signal from the merchant system computing device and from the one or more local computing devices is a near field communication signal.

8. The computer-implemented method of claim 1, wherein the digital wallet secure application is a chat application.

9. The computer-implemented method of claim 1, wherein the merchant system computing device is a point of sale terminal.

10. A computer program product, comprising:
    a non-transitory computer-readable storage device having computer-executable program instructions embodied thereon that when executed by a local computer cause the local computer to allow remote computing devices access to local wireless signals of local computers and allow remote computing devices to conduct transactions with merchant terminals, the computer-executable program instructions comprising:
        computer-executable program instructions to initiate a digital wallet secure application that is in communication with a digital wallet secure application on a remote computing device;
        computer-executable program instructions to receive a proximity wireless signal from a merchant computing device;
        computer-executable program instructions to receive an input from a user on the digital wallet secure application requesting a forwarding of the proximity wireless signal to the remote computing device that is out of range of the proximity wireless signal;

computer-executable program instructions to convert a set of data from the proximity wireless signal to a format that is suitable for transmission to the remote computing device;

computer-executable program instructions to communicate the set of data from the proximity wireless signal to the remote computing device;

computer-executable program instructions to receive a communication from the remote computing device, the communication comprising a second set of data for transmitting via a second proximity wireless signal to the merchant computing device, wherein the second set of data comprises broadcast data and instructions to broadcast wireless data to the merchant computing device;

computer-executable program instructions to convert the second set of data into a format suitable for communication via the second proximity wireless signal;

computer-executable program instructions to broadcast, the second set of data via the second proximity wireless signal to the merchant computing device; and computer-executable program instructions to establish wireless communication between the merchant system computing device and the remote computing device.

11. The computer program product of claim 10, further comprising:

computer-executable program instructions to receive an input from the user requesting that the forwarding of the proximity wireless signal to the remote computing device be disabled; and computer-executable program instructions to disable the forwarding of the proximity wireless signal to the remote computing device.

12. The computer program product of claim 10, wherein the communication of the data from the merchant computing device and the data from the remote computing device are sufficient to conduct a financial transaction.

13. The computer program product of claim 10, wherein the wireless signal from the merchant computing device and from the computer is a near field communication signal.

14. The computer program product of claim 10, wherein the proximity wireless signal from the merchant computing device is a beacon signal.

15. The computer program product of claim 14, wherein the beacon signal is transmitted via Bluetooth or infrared.

16. The computer program product of claim 10, wherein the communication of the data from the merchant computing device and the data from the remote computing device are sufficient to provide an offer to the remote computing device.

17. The computer program product of claim 10, wherein the beacon signal is transmitted via Bluetooth or infrared.

18. The computer program product of claim 10, wherein the digital wallet secure application is a chat application.

19. The computer program product of claim 10, wherein the merchant computing device is a point of sale terminal.

20. A system to select payment accounts to allow remote computing devices access to local wireless signals and allow remote computing devices to conduct transactions with merchant terminals, comprising:

a local storage resource; and a local processor communicatively coupled to the storage resource, wherein the local processor executes application code instructions that are stored in the local storage resource to cause the local processor to:

initiate a digital wallet secure application that is in communication with a remote digital wallet secure application on a remote computing device;

receive a proximity wireless signal from a merchant computing device;

receive an input from a user requesting a forwarding of the proximity wireless signal to the remote computing device that is out of range of the proximity wireless signal;

convert a set of data from the proximity wireless signal to a format that is suitable for transmission to the remote computing device;

communicate the set of data from the proximity wireless signal to the remote computing device;

receive a communication from the remote computing device, the communication comprising a second set of data for transmitting via a second proximity wireless signal to the merchant computing device, wherein the second set of data comprises broadcast data and instructions to broadcast wireless data to the merchant system computing device;

convert the second set of data into a format suitable for communication via the second proximity wireless signal;

broadcast, the second set of data via the second proximity wireless signal to the merchant computing device; and establish wireless communication between the merchant computing device and the remote computing device.

21. The system of claim 20, wherein the communication of the data from the merchant computing device and the data from the remote computing device are sufficient to conduct a financial transaction.

22. The system of claim 20, wherein the proximity wireless signal from the merchant computing device is a beacon signal.

23. The system of claim 22, wherein the beacon signal is transmitted via Bluetooth or infrared.

24. The system of claim 20, further comprising instructions to cause the local processor to:

receive an input from the user requesting that the forwarding of the proximity wireless signal to the remote computing device be disabled; and disable the forwarding of the wireless signal to the remote computing device.

25. The system of claim 20, wherein the communication of the data from the merchant computing device and the data from the remote computing device are sufficient to provide an offer to the remote computing device.

26. The system of claim 20, wherein the beacon signal is transmitted via Bluetooth or infrared.

27. The system of claim 20, wherein the proximity wireless signal from the merchant computing device and from the local processor is a near field communication signal.

28. The system of claim 20, wherein the digital wallet secure application is a chat application.

29. The system of claim 20, wherein the merchant computing device is a point of sale terminal.

* * * * *